May 21, 1940.  H. E. TWOMLEY  2,201,357

SPEED REDUCING MECHANISM

Filed Jan. 17, 1936  5 Sheets-Sheet 1

INVENTOR.
Herbert E. Twomley
BY Lyon & Lyon
ATTORNEYS

May 21, 1940.     H. E. TWOMLEY     2,201,357
SPEED REDUCING MECHANISM
Filed Jan. 17, 1936     5 Sheets-Sheet 2

INVENTOR.
Herbert E. Twomley
BY Lyon & Lyon
ATTORNEY.

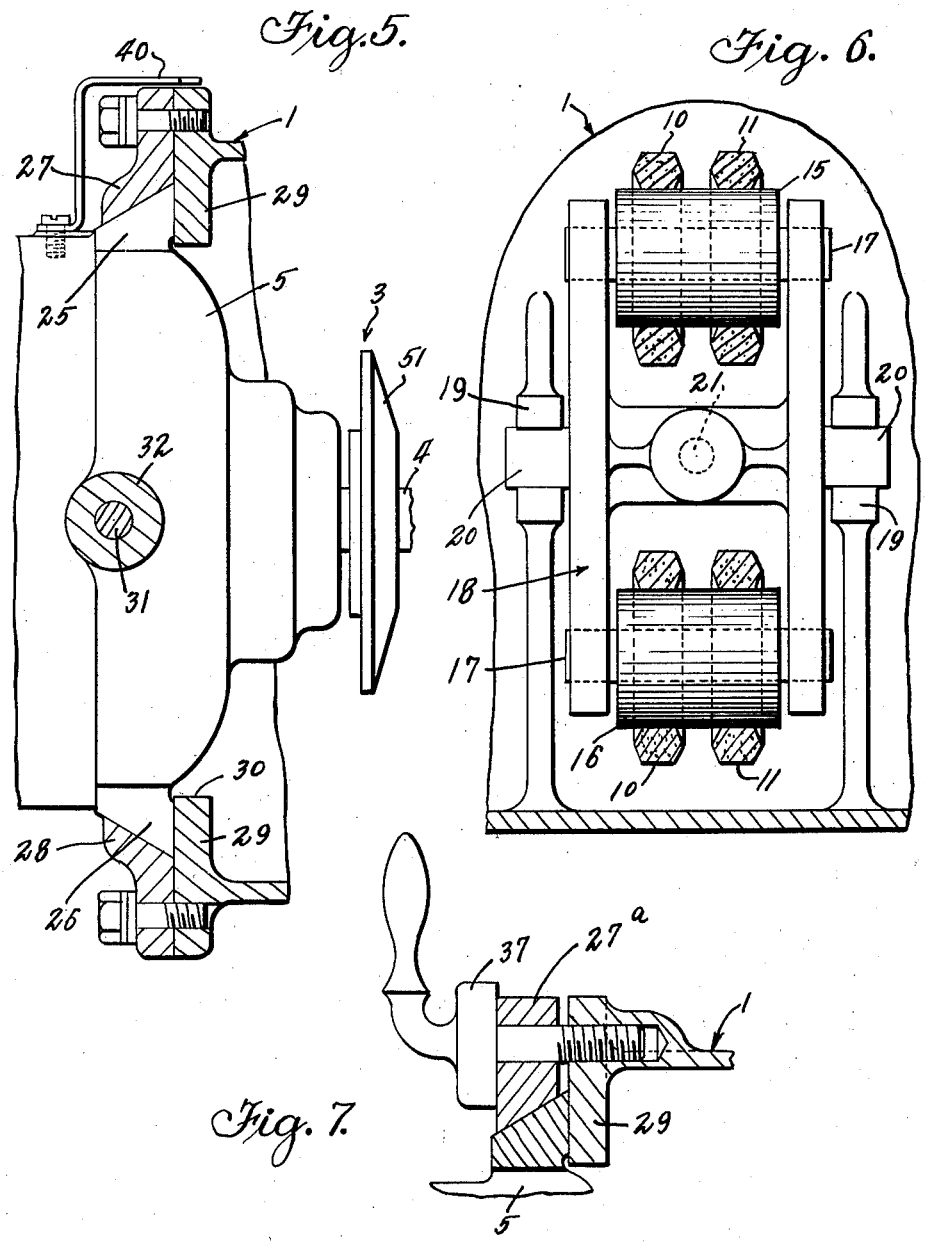

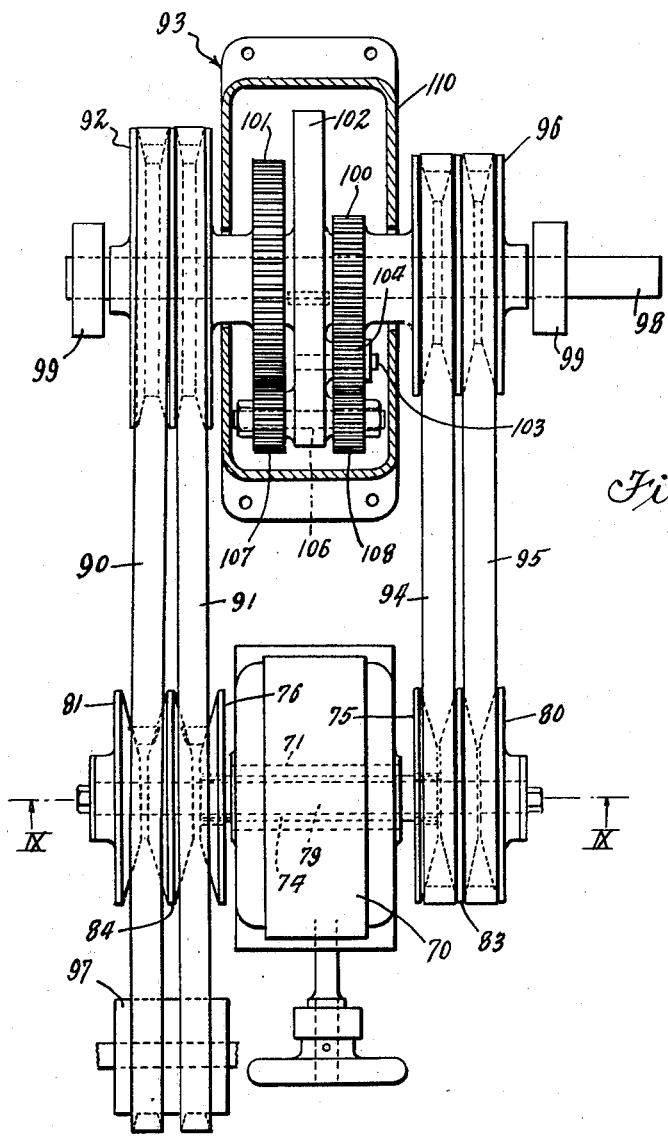

May 21, 1940.   H. E. TWOMLEY   2,201,357
SPEED REDUCING MECHANISM
Filed Jan. 17, 1936   5 Sheets-Sheet 5

INVENTOR.
Herbert E. Twomley
BY Lyon & Lyon
ATTORNEY.

Patented May 21, 1940

2,201,357

UNITED STATES PATENT OFFICE 2,201,357

SPEED REDUCING MECHANISM

Herbert E. Twomley, Riverside, Calif., assignor to Food Machinery Corporation, San Jose, Calif., a corporation of Delaware Application January 17, 1936, Serial No. 59,553

4 Claims. (Cl. 74—230.17)

This invention relates to variable speed power transmitting mechanisms of the type employing belt drives with variable diameter V pulleys for effecting speed variations. The invention relates more particularly to high-ratio speed reducing mechanisms employing variable diameter V pulleys or belts for driving two members of a differential unit at variable high speeds in opposite directions whereby a third member of the differential unit is rotated at a variable, relatively low speed.

Variable diameter V pulleys are ordinarily formed of two distinct members having angular belt engaging surfaces movable toward each other to increase the effective diameter of the pulley and movable away from each other to decrease the effective diameter of the pulley. If only one of the pulley members is moved or if the two pulley members are moved by unequal amounts, the median plane will be shifted, thereby throwing the pulley out of alignment with its belt unless the cooperating pulley is also shifted.

One object of this invention is to provide a simple and practicable method of mounting variable diameter V pulleys so that they remain in their original position of alignment despite variations in pulley diameter even though the variation in diameter is obtained by directly moving only one of the members of the pulley.

Another object is to provide a simple and efficient mechanism for driving two members of a differential unit at opposite directions at inversely variable speeds, from a single drive shaft.

Other more specific objects and features of the invention will appear from the following detailed description which refers to the drawings.

In the drawings:

Fig. 5 is a detailed vertical view, partly in section, showing a portion of the motor casing and its supporting frame employed in the mechanism of Fig. 1;

Fig. 6 is a detailed end elevation of the mechanism shown in Figs. 1 and 2, showing the construction of the idler pulleys and their supports;

Fig. 7 is a detailed view showing a construction alternative to that shown in Fig. 5 for locking the motor case in its supporting frame;

Fig. 8 is a plan view, partly in section, of an alternative construction, in accordance with the invention, to that disclosed in Figs. 1 to 7.

Figure 1:
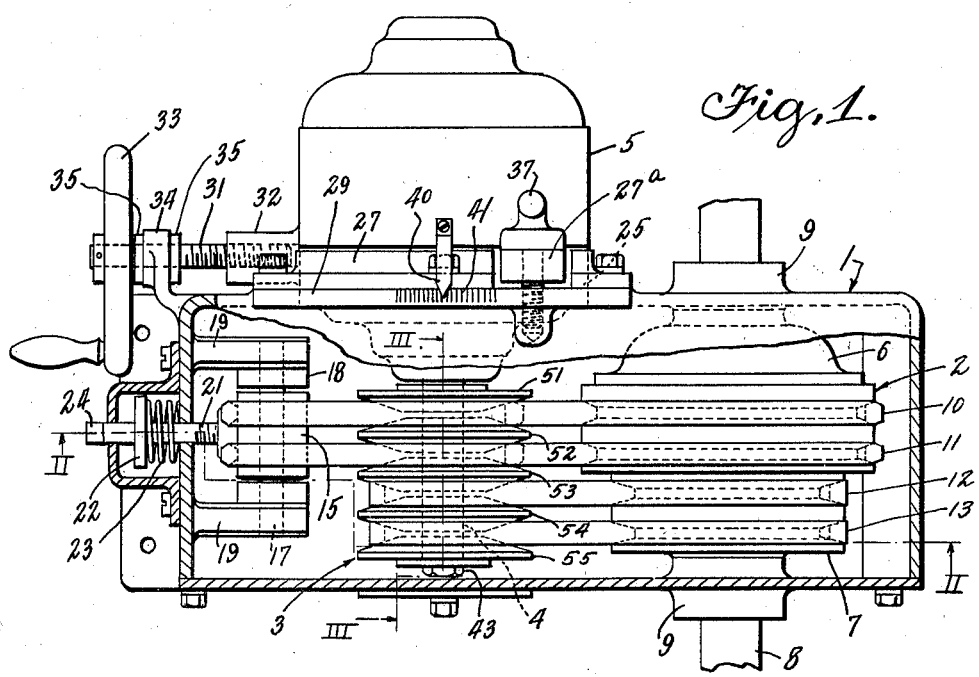
Fig. 1 is a plan view of one embodiment of a variable speed power transmitting mechanism in accordance with the invention.
Figure 2:
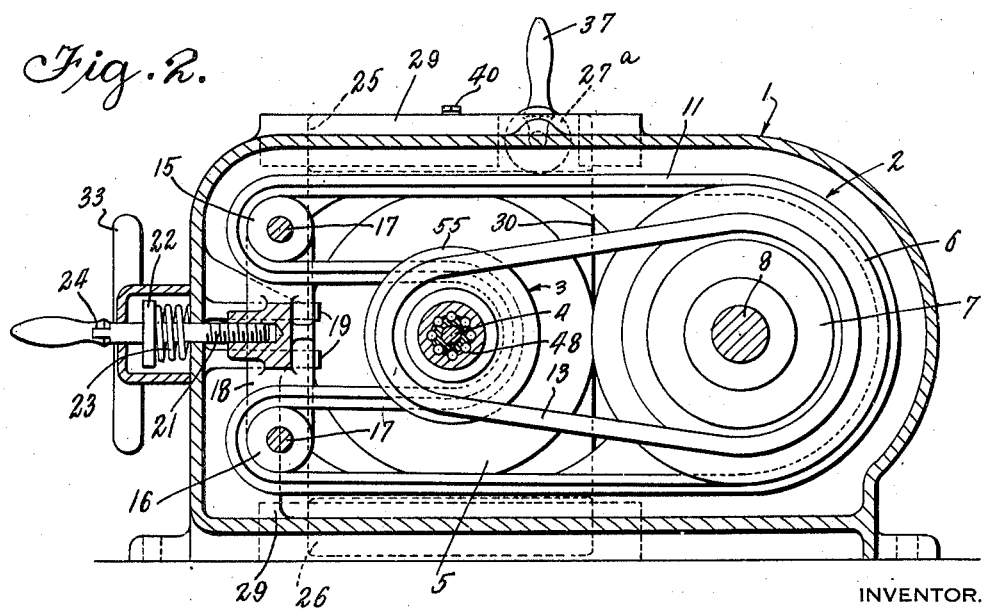
Fig. 2 is a sectional view of the same structure taken along the line II—II of Fig. 1.

Referring to Figs. 1 and 2, the variable speed power transmitting mechanism there disclosed comprises an enclosing and supporting case 1 containing a differential unit 2 and drive pulleys 3 mounted upon the shaft 4 of an electric motor 5.

The differential unit 2 may be of any known construction and consists essentially of two elements 6 and 7, respectively, rotatably mounted upon a shaft 8 which in turn is rotatably supported in journals 9 in the walls of the casing 1. The differential unit is so constructed that in response to rotation of the elements 6 and 7 in opposite directions at high speed, the shaft 8 rotates slowly in one direction. The direction and speed of rotation of shaft 8 depends upon the internal construction of the differential unit and may be varied within wide limits, as is well known to those skilled in the art. Since the differential unit per se does not constitute a part of the present invention, it need not be described in detail.

The units 6 and 7 are each provided with two pulley grooves for receiving driving belts 10, 11 and 12 and 13, respectively. As shown, the member 7 is of smaller diameter than the member 6 at the point of engagement with the driving belts in order to provide a particular speed relation between the shaft 8 and the members 6 and 7. However, these members may be made of any desired relative diameters depending upon the speed ratio that is desired.

The belts 10 to 13, exclusive, are driven from the pulley mechanism 3 on shaft 4 of the motor. Belts 12 and 13 loop directly about the pulley 3 so that differential member 7 rotates in the same direction as shaft 4. These belts 12 and 13 may be conventional V belts. The belts 10 and 11, on the other hand, instead of being looped directly over the pulley 3, are first looped over idler pulleys 15 and 16, respectively, positioned beyond the pulley 3 from the differential unit 6 and are then reverse looped back over the pulley 3, thereby reversing the direction of rotation of the differential member 6 with respect to the pulley 3.

The idler pulleys 15 and 16 are rotatably supported upon shafts 17 secured to a frame member 18 which is slidably supported for movement toward and away from the motor shaft 4 by guides 19 secured to the casing 1. Thus the member 18 may have laterally extending tongues 20 which fit between the guides 19 (Fig. 6). To impart a suitable tension to the belts 10 and 11 the carriage 18 supporting the idler pulleys 15 and 16 is provided with a tensioning bolt 21 screwed thereinto and projecting through an aperture provided therefor in the end wall of the case 1. Beyond the case the bolt 21 is provided with a stop member 22 and a helical spring 23 is compressed between the stop member 22 and the wall of the casing 1. The spring 23 therefore urges the carriage 18 to the left (with reference to Fig. 2) to maintain the belts 10 and 11 taut at all times. The tension applied to the belts may be varied by screwing the belt 22 in or out of the carriage 18 and to facilitate such adjustment the outer end of the bolt 21 may be provided with wrench surfaces as indicated at 24.

The pulley mechanism 3, which will be described in detail later, varies the effective diameters of the surfaces engaging the belts 10, 11 and 12, 13, respectively, in response to variations in the tensions on those belts. In practice, the tensions on the belts are varied by shifting the motor 5 longitudinally to carry the pulleys 3 toward or away from the differential unit 2. To facilitate longitudinal adjustment of the motor 5, the latter is adjustably mounted on the side of the casing 1. Thus referring to Fig. 5, the motor 5 is provided with parallel angle flanges 25 and 26 at the top and bottom, respectively, which flanges are engaged by guides 27 and 28, respectively, secured to the rear wall 29 of the casing 1. This wall 29 is provided with an elongated opening 30 for receiving the end of the motor 5 which projects slightly within the casing. In the construction shown in Fig. 5 the guides 27 and 28 do not clamp the flanges 25 and 26 against the casing wall 29 but merely support the flanges 25 for free sliding movement. The longitudinal position of the motor is determined by a screw 31 which is threaded into a suitable nut member 32 attached to the motor 5, the screw 31 extending in the direction of longitudinal adjusting movement of the motor. At its outer end the screw 31 terminates in a smooth shaft, to the outer end of which a hand wheel 33 is pinned. The smooth portion of the screw shaft is rotatably supported in a journal 34 secured to the casing 1. Flanges 35 on the screw shaft prevent longitudinal movement of the screw with respect to the journal 34 so that rotating the hand wheel 33 shifts the motor 5 longitudinally. The normal frictional resistance to movement of the screw 31 will normally suffice to maintain the motor in any position to which it has been moved. However, in some instances it may be desirable to positively lock the motor against movement after it has been moved to a desired position of adjustment. To this end, a section of the guide 27 is cut away to make room for a clamp block 27a which is adjustably supported on the casing 1 by means of a hand screw 37 (Figs. 7, 1 and 2). By loosening the screw 37 the motor may be shifted by turning hand wheel 33. Thereafter by tightening the screw 37 the motor is firmly locked against further movement.

To indicate the position of adjustment of the motor 5, the latter may be provided with a pointer 40 which extends up over the supporting flange 27 and cooperates with a scale 41 on the top edge of the casing 1.

The structure of the drive pulley 3 will now be described with reference to Figs. 3 and 4. The motor shaft 4 has rigidly secured thereto as by a key 42 and a bolt 43 a sleeve 44, which sleeve is provided with a plurality of longitudinal grooves 45 symmetrically disposed on its outer surfaces. A second sleeve 46 of internal diameter slightly greater than the internal diameter of sleeve 44 is positioned concentrically about sleeve 44 and is also provided with longitudinal grooves 47 in its inner surface, which grooves are juxtaposed to the grooves 45. Each pair of juxtaposed grooves 45 and 47 contains a series of balls 48 which maintain the sleeves 44 and 46 in concentric relation with each other and prevent relative rotation therebetween while permitting free longitudinal movement of the sleeve 46 upon the sleeve 44 within certain limits. Escape of the balls 48 from their containing grooves is prevented by inwardly projecting flanges 49 and 50, respectively, on the sleeve 46.

The pulleys proper are defined by a plurality of separate pulley members 51, 52, 53, 54 and 55, which define the belt contacting surfaces. The end members 51 and 55 are rigidly attached to the sleeve 46 whereas the intermediate members 52, 53 and 54 are slidable longitudinally on the sleeve 46 but are restrained from rotation thereabout.

To retain the member 51 in position on the end of sleeve 46, screw holes may be provided at the juncture between the pulley member and the sleeve for receiving screws 59. The member 55 is retained in position on the sleeve 46 and the members 52, 53 and 54 are restrained from rotation with respect to members 51 and 55 and the sleeve 46 by bolts 60 which extend clear through the members from one end to the other and clamp the end members 51 and 55, respectively, snugly against the ends of sleeves 62 which surround the bolts 60 and extend through the pulley members 52, 53 and 54 but abut against the end members 51 and 55. Member 55 may be restrained from rotation about the sleeve by keys 61. The members 52, 53 and 54 are slidably fitted upon the sleeve 46 and also upon the sleeve 62 on the bolts 60.

The device functions as follows: Assuming that the motor 5 is energized to rotate its shaft 4, the latter rotates the sleeve 44 and the sleeve 46 through the balls 48 and sleeve 46 in turn rotates the various pulley members 51 to 55, inclusive. This drives the belts 10 to 13, inclusive, to rotate the differential members 6 and 7 in opposite directions. The relative speeds of the differential members 6 and 7 will be determined by the relative diameters of the pulleys engaging the belts 10, 11 and 12, 13, respectively. The diameters of these pulleys in turn will be determined by the relative tensions of the belts 10, 11 and 12, 13, respectively, on the pulley 3 and this in turn, of course, will depend upon the position of longitudinal adjustment of the motor 5. If the adjustment is such as to tighten belts 10 and 11 and loosen belts 12 and 13, then belts 10 and 11 will ride down between their cooperating pulley members 51, 52 and 53, respectively, forcing the member 52 outwardly along the sleeve 46 a short distance and forcing the member 53 outwardly along the sleeve 46 a somewhat greater distance. This crowds members 53, 54 and 55 more closely together, forcing the belts 12 and 13 outwardly and clearly shown in Fig. 3. Assuming that all of the grooves on the pulley 3 were aligned with the cooperating pulleys on the differential member in any one position of adjustment of the elements 52, 53 and 54, then any movement of members 52, 53 and 54 would displace the median planes of the four pulley grooves from their original positions, tending to throw the belts out of alignment with their grooves on the pulley 3. However, in response to any tendency toward misalignment, the belts apply a force to the belt engaging surfaces of the pulleys, tending to shift the pulleys back into alignment. This force causes the sleeve 46 to slide longitudinally along the sleeve 44, the balls 48 rolling to permit such movement without material friction loss. The entire pulley as a unit on the sleeve 46 therefore shifts longitudinally back and forth to compensate for misalignment resulting from movement of the members 52, 53 and 54 with respect to the stationary end members 51 and 55.

Although the construction described employs a dual belt drive to each of the differential units 6 and 7, respectively, it is obvious that a single belt may be employed for driving each differential unit or that the number may be increased above two. Variation of the number of belts employed merely means the elimination of some of the intermediate members 52, 53 or 54 on the pulley or the addition of intermediate members.

Figure 9:
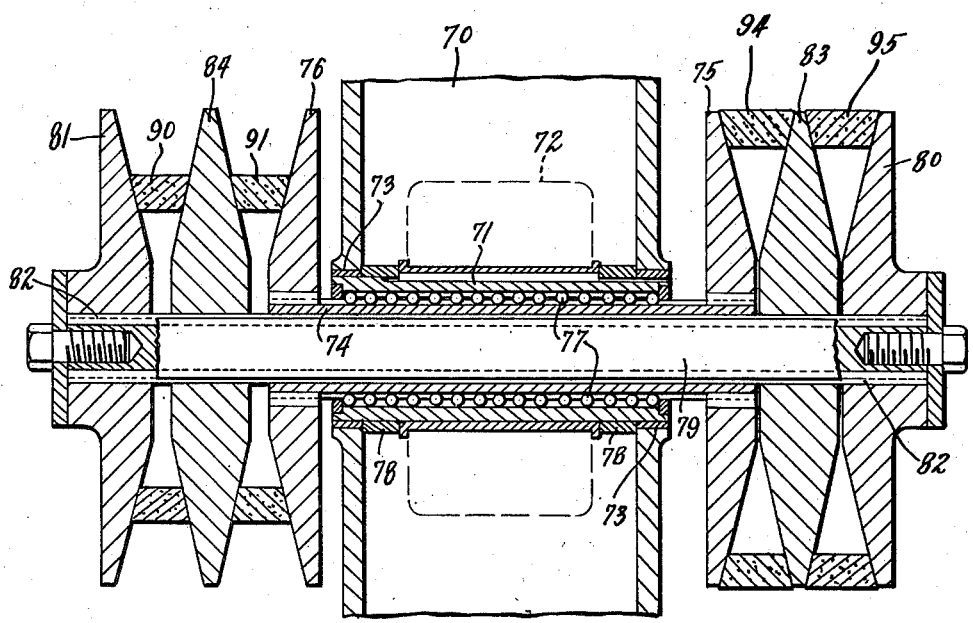
Fig. 9 is a detailed vertical section in the plane IX—IX of Fig. 8 showing the construction of the motor shaft and variable diameter pulleys thereon.

Referring now to Figs. 8 and 9, in the embodiment of the invention therein depicted the pulley elements for driving the two differential units are positioned on opposite ends of the motor. Thus the motor 70, which may be mounted for longitudinal adjustment movement in a manner similar to that described with reference to Fig. 1, is provided with a hollow shaft 71 (Fig. 9) upon which the motor rotor 72 is mounted, the hollow shaft being journaled in bearings 73 in the motor casing in accordance with accepted practice. The hollow shaft 71 surrounds a second hollow shaft or sleeve 74 which extends beyond the motor housing on both ends and has anchored to its opposite ends pulley members 75 and 76, respectively. The hollow shafts 71 and the sleeves 74 are provided with juxtaposed longitudinal grooves containing balls 77 exactly as described with reference to Fig. 3 so that although the sleeve 74 is forced to rotate with the hollow motor shaft 71, it is free to slide longitudinally back and forth within the motor shaft. The motor shaft 71 may, of course, be restrained from longitudinal movement with respect to the motor housing as by thrust members 78 positioned between the ends of the rotors 72 and the journals 73.

Positioned within the sleeve 74 and extending therebeyond at both ends is a shaft 79, upon the outer ends of which are solidly anchored pulley members 80 and 81, respectively. The shaft 79 is preferably provided with splines 82 which engage grooves in the sleeve 74 and in the pulley members 80 and 81 to prevent relative rotation therebetween. Intermediate pulley members 83 and 84 are positioned between the pulley members 75 and 80 and 76 and 81, respectively, and slidably mounted upon the shaft 79. However, these pulleys 83 and 84 also have grooves engaging splines 82 and thereby preventing relative rotation between the pulley elements and the shaft.

The three elements 81, 84 and 76 define therebetween two pulley grooves for engaging pulleys 90 and 91 extending to a rigid double groove V pulley 92 on the differential unit 93. The pulley members 75, 83 and 80 likewise define therebetween two pulley groove receiving belts 94 and 95, respectively, which extend into driving engagement with another double groove pulley 96 on the differential unit 93. The belts 94 and 95 couple the drive pulley directly to the differential pulley 96. The belts 90 and 91, however, are reverse looped over idlers 97 and then reverse looped back over the pulley members 84, 81 and 76 on the motor drive assembly. The detailed construction of the idler pulleys 97 is not disclosed since it may be constructed in the same general manner as in the embodiment disclosed in Figs. 1 and 2.

The differential unit 93 consists of a central driven shaft 98 rotatably supported in a pair of stationary journals 99. The pulley units 92 and 96 are in turn rotatably supported upon the shaft 98. The pulley member 96 has rigidly attached thereto a spur gear 100 and the pulley 92 has rigidly attached thereto a spur gear 101. Keyed to the shaft 98 between the spur gears 100 and 101 is an arm 102 bearing a stub shaft 103 for supporting an idler gear 104 and rotatably supporting a shaft 106, to the opposite ends of which are keyed pinions 107 and 108, respectively. Pinion 107 meshes directly with the spur gear 101 and pinion 108 is reverse coupled to the spur gear 100 by the idler gear 104. The spur gear assembly may be enclosed in a protecting case 110.

The device described with reference to Figs. 8 and 9 functions as follows: With the motor 70 in operation, the belts 90, 91 and 94, 95 are driven in opposite directions at speeds depending upon the effective diameters of the pulley members on the motor shaft engaged by those belts. This drives the differential pulleys 92 and 96 in opposite directions, thereby rotating the gears 100 and 101 in opposite directions. As a result of the reversing effect of the idler pinion 104, however, both gears 100 and the gears 101 tend to rotate the pinions 107 and 108 in the same direction. However, by reason of the difference in sizes of gears 100 and 101, they tend to drive the pinions 107 and 108 at different speeds. Since these pinions are positively coupled together by the shaft 106 they cannot rotate at different speeds and the result is that the arm 102 and the shaft 98 rotate to revolve the pinions 107 and 108 about the gears 100 and 101 at a speed which is a function of the relative ratios of the gears 100 and 101 and of the relative speeds of those gears.

To change the speed of the driven shaft 98, which may be coupled by any suitable device not shown to a mechanism to be driven, the motor 70 is shifted toward or away from the differential unit 93, thereby tending to tighten the belts 94, 95 and loosen the belts 90, 91 or vice versa.

Now referring to Fig. 9, it will be observed that the pulley members 76 and 75 are rigidly secured together by the sleeve 74 and that the pulley members 80 and 81 are rigidly secured together through the central shaft 79. With the apparatus in the position shown in Fig. 9, belts 99 and 91 are riding near the centers of the pulley members 81, 84 and 76 and the belts 94 and 95 are riding near the outer peripheries of the pulley members 75, 83 and 80. With this arrangement, belts 94 and 95 will be driven at a greater linear speed than belts 90 and 91. It will now be assumed that it is desired to reduce the speed of the differential member 96 and increase the speed of differential member 92. To effect this result, the motor 70 will be shifted away from the differential unit 93, thereby tightening belts 94, 95 and loosening belts 90, 91. The increased tension on belts 94, 95 spreads the pulley members 75, 83 and 80. In actual practice a central member 93 may remain substantially stationary, the member 80 moving outwardly, thereby carrying the shaft 79 and the member 81 to the right and the member 75 moving inwardly, thereby carrying the sleeve 81 and the member 76 to the left. The result will be that member 84 will likewise remain substantially stationary whereas members 81 and 76 will both move toward belt 84 to force the belts 94 and 95 to move nearer the pulley members.

Figure 3:
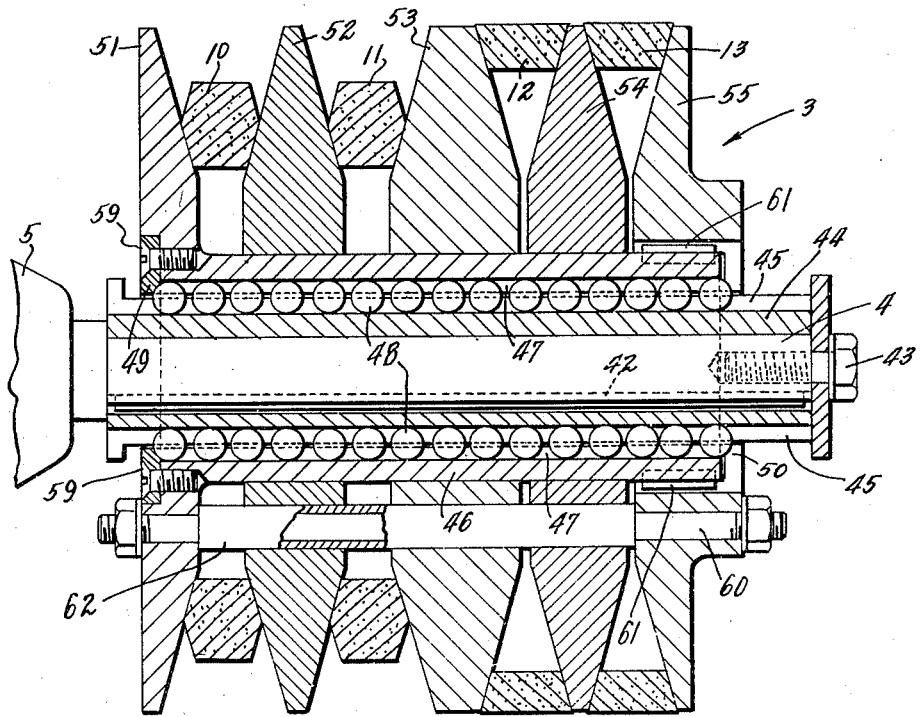
Fig. 3 is a detail sectional view taken in the plane III—III of Fig. 1.
Figure 4:
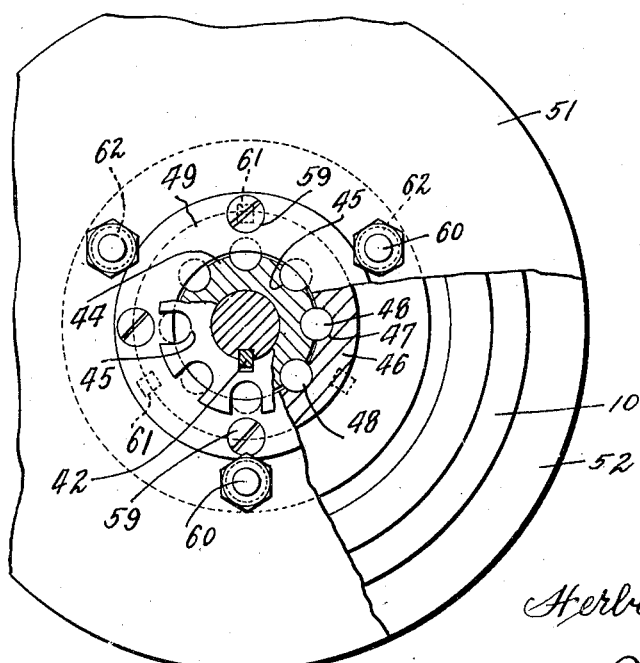
Fig. 4 is a detailed end view of the mechanism shown in Fig. 3.

In both the constructions shown in Figs. 3 and 9, it will be observed that the connection between the main motor drive shaft and the pulley unit is effected by ball bearings which have very little friction. Therefore, the pulley assembly in each case is very free to move in response to misalignment of the belts. This is desirable because the lateral force exerted by the belts may be relatively slight. On the other hand, the connections between the various pulley members 51, 52, 53 and 54 and 55 in Fig. 3 and between the members 81, 84, 76, 75 and 80 in Fig. 9 need not have particularly low friction characteristics because these members are moved relative to each other by the direct spreading force of the V belts which may be made to have very substantial values.

Although the invention has been described with reference to certain specific embodiments for purposes of illustration, it will be obvious that many variations can be made in the particular structures disclosed without departing from the invention and the latter is therefore to be limited only as set forth in the appended claims.

I claim:

1. A mechanism of the type described, comprising in combination a motor having a supporting housing and a hollow rotor member rotatably supported in said housing, a sleeve extending through said rotor member and projecting therebeyond on both ends, a first pair of pulley members each defining one half of a V pulley rigidly secured to said sleeve at spaced apart points thereon on opposite sides of said motor, a shaft positioned within said sleeve and extending therebeyond at both ends, means coupling said shaft to said sleeve for rotation therewith and longitudinal movement with respect thereto, means including a pair of pulley members attached to said shaft for cooperating with the pulley members on said sleeve to define therewith inversely variable V pulleys on the opposite sides of said motor, a pair of driven pulleys to be driven at relatively variable speeds, a pair of belts each coupling one of said driven pulleys to one of said variable pulleys, means for tightening one of said belts and loosening the other, to shift said shaft longitudinally with respect to said sleeve and thereby inversely vary said variable V pulleys, and means connecting said sleeve to said rotor member for rotation therewith and free longitudinal movement therewithin whereby said sleeve, shaft, and pulley members thereon are free to move longitudinally as a unit to compensate for pulley adjusting movement of said shaft and maintain said variable pulleys in alignment with their respective belts.

2. A mechanism of the type described, comprising in combination a motor having a supporting housing and a hollow rotor member rotatably supported in said housing, a sleeve extending through said rotor member and projecting therebeyond at both ends, a first pair of pulley members each defining one half of a V pulley rigidly secured to said sleeve on opposite sides of said motor, a shaft positioned within said sleeve and extending therebeyond at both ends, means coupling said shaft to said sleeve for rotation therewith and longitudinal movement with respect thereto, a pair of pulley members attached to said shaft and positioned outwardly from the first pair of pulley members and a plurality of pulley members slidable on said shaft between each pair of juxtaposed pulley members on said shaft and on said sleeve, respectively, the set of pulley members on each side of said motor defining a plurality of variable diameter pulleys, two sets of driven pulleys to be driven at relatively variable speeds, two sets of belts each coupling one set of driven pulleys to the variable pulleys on one end of said motor, means for tightening one set of belts and loosening the other set of belts to shift said shaft and the pulley members slidably mounted thereon longitudinally with respect to said sleeve and thereby inversely vary the diameters of the variable V pulleys on opposite sides of said motor, and means connecting said sleeve to said rotor member for rotation therewith and free longitudinal movement therewithin whereby said sleeve shaft and the pulley members thereon are free to move longitudinally as a unit to compensate for pulley-adjusting movement of said shaft and maintain said variable pulleys at least in approximate alignment with their respective belts.

3. A mechanism of the type described comprising a first rotatable member fixed against axial movement, a second rotatable member coaxial with said first member, a third rotatable member coaxial with said first and second members, said second and third members defining a first V pulley, the effective diameter of which varies in response to axial movement between said second and third members, a second V pulley and means mounting it opposite said first V pulley for rotation about an axis parallel to the axis of rotation of said first pulley, a belt coupling said first and second V pulleys, said belt tending to spread the second and third members to thereby decrease the effective diameter of said first pulley, means urging said second and third members toward each other to thereby tend to increase the effective diameter of said first V pulley, sliding bearing means mounting said third member on said second member for rotation therewith and axial movement with respect thereto in response to a change in tension of said belt relative to the force exerted by said urging means, and rolling bearing means mounting said second member on said first member for rotation therewith and axial movement with respect thereto, whereby there is less frictional resistance to axial movement between said first and second members than between said second and third members.

4. A mechanism of the type described comprising in combination, a shaft, a V-pulley to be coupled to said shaft and means for rotatably supporting said pulley for rotation about an axis parallel to said shaft, a sleeve on said shaft, a pair of separable pulley members on said sleeve defining a variable diameter V-pulley, one of said members being fixed relative to said sleeve and the other being slidably mounted on the sleeve, means for shifting said slidable member on the sleeve for varying the effective diameter of the variable diameter pulley, including a belt coupling said first mentioned pulley to said variable diameter pulley, and rollable bearing means mounting said sleeve on said shaft for rotation therewith and for longitudinal movement therealong whereby said sleeve and separable pulley members are free to move longitudinally to compensate for adjusting movement along said sleeve of said other pulley member and maintain alignment between said belt and variable pulley, said shaft and sleeve having cooperating longitudinal grooves in their juxtaposed surfaces and said rollable bearing means mounting the sleeve on the shaft comprising balls fitting in the juxtaposed grooves in the shaft and sleeve.

HERBERT E. TWOMLEY.